United States Patent Office 3,507,911
Patented Apr. 21, 1970

3,507,911
DI-SUBSTITUTED MALONIC ACIDS
Rudolf G. Griot and Johann R. Oetterli, Florham Park, N.J., assignors to Sandoz-Wander, Inc., Hanover, N.J., a corporation of Delaware
No Drawing. Continuation-in-part of abandoned application Ser. No. 547,771, May 5, 1966. This application Aug. 2, 1966, Ser. No. 577,559
Int. Cl. C07c 65/14
U.S. Cl. 260—520
22 Claims

ABSTRACT OF THE DISCLOSURE

The compounds are useful therapeutically as hypocholestermics/hypolipemics and have the formula

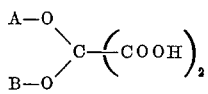

A may be phenyl or substituted phenyl and B is substituted phenyl which otherwise may be like or unlike A, e.g., bis(p-chlorophenoxy)malonic acid. The substituents include trifluoromethyl, (lower)alkanoylamido, (lower)alkylthio, cyclo(lower)alkyl, phenyl, phenoxy, phenylthio, anilino, benzoyl, phenyl(lower)alkyl, halogen, (lower)alkyl and nitro.

---

This application is a continuation-in-part of our copending application Ser. No. 547,771, filed May 5, 1966, now abandoned.

This invention relates to derivatives of malonic acid. In particular, the invention is concerned with di-substituted malonic acids of the formula

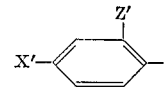

wherein:

A is either

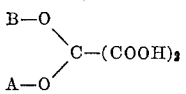

B is

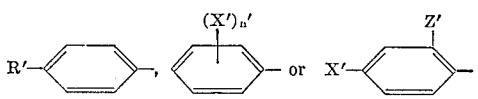

when A is either

or
B is

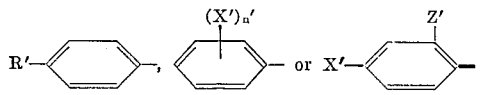

when A is either

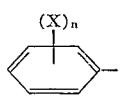

or
B is

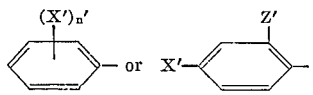

when A is

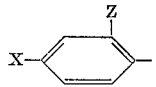

R is hydrogen; trifluoromethyl; loweralkanoylamido, preferably containing from 2 to 4 carbon atoms, e.g., acetamido, propionamido and butyrylamido; loweralkylthio, preferably containing from 1 to 4 carbon atoms, e.g., methylthio, ethylthio, propylthio and butylthio; cyclololoweralkyl, preferably containing from 5 to 7 carbon atoms, e.g., cyclopentyl, cyclohexyl and cycloheptyl; or an aromatic moiety of the formula

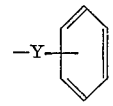

R' is trifluoromethyl; loweralkanoylamido, preferably containing from 2 to 4 carbon atoms, e.g., acetamido, propionamido and butyrylamido; loweralkylthio, preferably containing from 1 to 4 carbon atoms, e.g., methylthio, ethylthio, propylthio and butylthio; cyclololoweralkyl, preferably containing from 5 to 7 carbon atoms, e.g., cyclopentyl, cyclohexyl and cycloheptyl; or an aromatic moiety of the formula

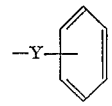

Y is either a direct bond or a bridging member of the group oxygen; sulfur; imino; carbonyl; or a straight chain loweralkylene, preferably containing from 1 to 4 carbon atoms, e.g., methylene, ethylene and trimethylene;

X and X' are the same or different and represent halogen, preferably having an atomic weight no greater than 80, i.e., fluorine, bromine or chlorine;

Z and Z' are the same or different and represent loweralkyl, preferably containing from 1 to 4 carbon atoms, e.g., methyl, ethyl, propyl and butyl; or nitro; and $n$ and $n'$ are the same or different and represent a whole number of from 1 to 3, inclusive or A and B are both m-trifluoromethylphenyl.

The preferred compounds of the present invention are those compounds of structural Formula I wherein A and B are the same, e.g., bis-(p-chlorophenoxy)malonic acid.

The above compounds (I) are prepared by reacting a di-substituted malonic acid ester with barium hydroxide to form a barium salt of the free acid and then converting the latter to the free acid. This process may be illustrated as follows:

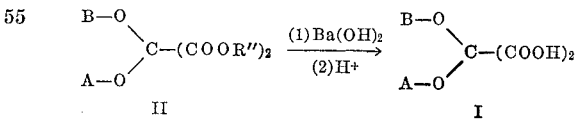

wherein:

A and B are as defined above; and
R" represents lower alkyl, preferably containing from 1 to 4 carbon atoms, e.g., methyl, ethyl, propyl, isopropyl, butyl and t-butyl.

The reaction of the malonic acid ester (II) with barium hydroxide is carried out in a suitable inert solvent system which is capable of solubilizing both the barium hydroxide and the malonic acid ester. Desirably, the solvent system is composed of a mixture of water and an organic solvent containing such amounts of each as may be necessary to solubilize the barium hydroxide and malonic acid ester, respectively. The particular organic solvent employed is not critical and the selection thereof is dependent upon the degree of solubility of the particular malonic acid ester in said solvent. However, it is preferred to employ an organic solvent which is water-miscible. Suitable solvents include the lower alkanols, e.g., methanol and ethanol, and ethers, e.g., diethyl ether, dioxane and tetrahydrofuran. The temperature at which the reaction is carried out, however, is critical to the extent that elevated temperatures (i.e., above about 35° C.) should not be employed. Preferably, the reaction is effected at ordinary room temperature (20-25° C.) although lower temperatures can be utilized. The resulting insoluble barium salt can be readily recovered in conventional manner.

The malonic acid (I) is obtained by reacting the thus-obtained barium salt with a strong acid at room temperature. This reaction is conveniently carried out in any suitable inert organic solvent such as a lower alkanol, e.g., methanol. Preferably, the solvent is one which is capable of solubilizing the free malonic acid and in which the barium salt, formed during the reaction with the strong acid, is insoluble. Desirably, the acid employed is a mineral acid, preferably sulfuric acid. Recovery of the free malonic acid is accomplished in conventional manner.

The malonic acid esters (II) employed as starting materials may be prepared by reacting an unsubstituted or appropriately substituted phenolate with an appropriately substituted malonic acid to form the corresponding substituted malonic acid ester derivative. The resulting product is then treated with a halogenating agent to form the corresponding α-halo-derivative and the latter reacted with an appropriately substituted phenolate to form the desired product. This process may be represented structurally as follows:

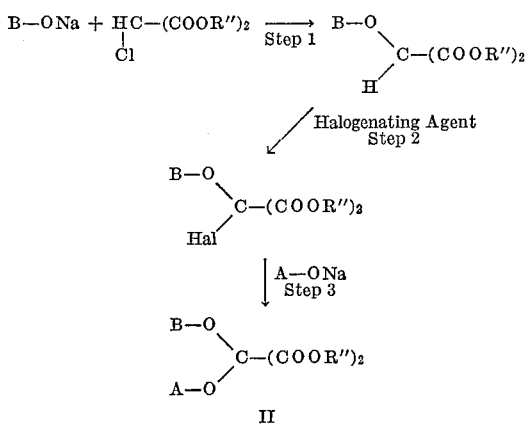

In the above formulae A, B and R'' are as defined hereinabove, and Hal represents halogen, preferably chlorine or bromine.

As illustrated above, Step 1 of the process invovles the reaction of the phenolate or substituted phenolate with a chloromalonic acid ester to form the corresponding substituted malonic acid ester derivative. This reaction is conveniently carried out in a suitable inert organic solvent such as dimethylacetamide, diethylacetamide, dimethylformamide or tetramethylurea. Preferably the reaction is initially carried out at elevated temperatures up to about 80° C. and then allowed to continue at room temperature. The particular solvent employed is not critical. Similarly, the particular temperature employer is not critical provided it does not exceed about 80° C.

In Step 2 of the process, the substituted malonic acid ester derivative is halogenated employing conventional agents for this purpose. The preferred agent is bromine, however, other agents such as chlorine, N-bromo-succinimide or sulfuryl chloride can also be used. The halogenation is conveniently carried out in a suitable inert organic solvent such as a haloalkane for example, dichloromethane, chloroform, carbon tetrachloride and the like. Preferably the reaction is initially carried out at room temperature and then allowed to continue at reflux temperature. However, neither the choice of solvent nor temperature employed is critical.

The last step of the process (Step 3 involves the reaction of the α-halo-derivative obtained in Step 2 with the appropriately substituted phenolate. This reaction is conveniently effected in a suitable inert organic solvent such as that employed in Step 1. Preferably this reaction is initially carried out at room temperature and then allowed to continue at elevated temperatures up to about 80° C. However, as indicated in Step 1, the choice of solvent or temperature employed is not critical provided that with respect to the latter, it does not exceed about 80° C. The resulting malonic acid ester (II) is readily recoverable employing conventional techniques.

The above process can be utilized for the preparation of all of the starting compounds represented by structural Formula II. Furthermore, it should be noted that the phenolate reactants employed in Steps 1 and 3 can be interchanged, that is, the phenolate of Step 3 can be employed as the reactant in Step 1 and the phenolate of Step 1 can be used as the reactant in Step 3.

Various of the phenolates employed as reactants in the above process are known and can be prepared as described in the literature. As to the others which are not specifically known, they can be readily prepared by methods analogous to those described in the literature. In general, such compounds are prepared by reacting the appropriate phenol with commercially available sodium hydride. If such procedure is utilized, it is highly desirable that any oil associated with the sodium hydride be removed prior to using the same. This can readily be accomplished by washing with an inert, dry solvent such as petroleum ether.

Various of the malonic acid derivatives employed as reactants in Step E can likewise be prepared as described in the literature. Such others which are not described in the literature may be prepared in analogous manner.

The malonic acid esters of structural Formula II wherein A and B are the same may also be prepared by reacting an appropriately substituted phenolate with a dihalomalonic acid ester. This process may be illustrated structurally as follows:

wherein:

A is m-trifluoromethylphenyl

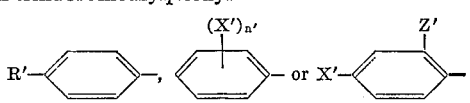

and

R', X', Z', R'', Hal and n' are as defined hereinabove.

This reaction is readily carried out in an inert organic solvent such as employed in Step 1 of the previous process and at room temperature, or elevated temperatures up to about 80° C. However, the particular solvent or temperature employed is not critical provided that with respect to the latter, it does not exceed about 80° C. The resulting product (IIa) is readily recovered in conventional manner.

As previously indicated hereinabove, the phenolates employed in the above process can be prepared as described in the literature or in analogous manner. Similarly, the statement above regarding the preparation of the phenolates employing sodium hydride is equally applicable to the instant process. Various of the preferred dihalomalonic acid esters employed are likewise known and can be prepared as described in the literature. Such others which are not specifically known can be prepared from available materials in analogous manner.

The compounds of structural Formula I are useful because they possess pharmacological activity. In particular the compounds are useful as hypocholesteremics/hypolipemics. For such usage the compounds may be admixed with conventional pharmaceutical carriers, and other adjuvants, if necessary, and administered orally in such forms as tablets, capsules, elixirs, suspensions or solutions. Furthermore, the compounds may be similarly administered in the form of their sodium or calcium salts. Such salts do not materially differ from the base in their pharmacological effects and are included within the scope of the invention. The salts are readily prepared by reacting the acid with an appropriate base in conventional manner. The dosage administered will, of course, vary depending on the compound employed. However, in general, satisfactory results are obtained when administered at a daily dosage of from about 1 gram to about 2 grams, preferably given in divided doses of from about 250 milligrams to about 1000 milligrams two to four times a day or in sustained release form. A representative formulation suitable for oral administration is a tablet prepared by standard tabletting techniques and containing (by weight) 50 parts of bis-(p-chlorophenoxy) malonic acid, 2 parts of tragacanth, 39.5 parts of lactose, 5 parts of corn starch, 3 parts of talcum and 0.5 part of magnesium stearate.

The following examples show the preparation of representative compounds contemplated by this invention. In the examples where parts and percentages are designated they are by weight unless otherwise specified, and the temperatures are in degrees centigrade. The relationship between parts by weight and parts by volume is the same as that between the kilogram and the liter. However, it is to be understood that these examples are intended for purposes of illustration only and are not intended as in any way limiting the scope of the invention which is defined in the appended claims.

EXAMPLE 1

Bis-(p-chlorophenoxy)malonic acid

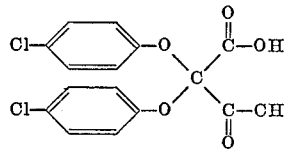

Step A: Preparation of bis-(p-chlorophenoxy)malonic acid diethyl ester.—Wash 43.3 parts (1.0 mole) of 5.7% sodium hydride in mineral oil with dry, low boiling petroleum ether. Then suspend the washed sodium hydride in 1500 parts by volume of dimethylacetamide and cool the obtained suspension to 0°. Add 141.4 parts (1.10 moles) of p-chlorophenol to the thus-cooled suspension at such a rate that the temperature thereof does not exceed 10° (external cooling with an ice/salt bath being employed as necessary).

After all of the p-chlorophenol is added, the mixture is stirred for an additional hour. Then remove the cooling bath, and add 159 parts (0.5 mole) of diethyldibromomalonate fairly rapidly allowing the temperature to rise to about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Dry the thus-washed organic phase over anhydrous magnesium sulfate, filter the dried organic phase and evaporate the solvent contained in the obtained filtrate to produce the desired product.

Recrystallization from 95% ethanol affords bis-(p-chlorophenoxy)-malonic acid diethyl ester, M.P. 48–50° C.

Step B: Preparation of bis-(p-chlorophenoxy)malonic acid.—Dissolve 16.1 parts (0.05 mole) of barium hydroxide in a mixture of 250 parts by volume of methanol and 20 parts by volume of water, heated slightly (30° C.) on a water bath. To the practically-clear solution add a solution of 20.65 parts (0.05 mole) of bis-(p-chlorophenoxy)malonic acid diethyl ester in 50 parts by volume of methanol. A very thick, white suspension forms almost immediately. Keep the suspension on the water bath for 15 minutes, then filter off the solids (barium salt) and dry the same in an oven under high vacuum. Suspend 4.92 parts (0.01 mole) of the dried solids in 50 parts by volume of methanol and add thereto a solution of 1.025 parts of concentrated sulfuric acid in 10 parts by volume of water. Shake the resulting mixture for ½ hour, filter off the insoluble material and evaporate the filtrate at room temperature under high vacuum. Dissolve the resulting oil in 50 parts by volume of diethyl ether, dry the ether solution over magnesium sulfate and remove the solvent with a water aspirator. Crystallize the resulting oil from ethylacetate-cyclohexane and recrystallize the resulting solids from ethylacetate-cyclohexane to obtain bis-(p-chlorophenoxy)malonic acid, M.P. 159–160° C. (dec.).

EXAMPLE 2

Bis-(4-biphenylyloxy)malonic acid

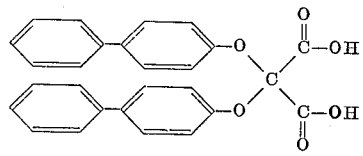

Step A: Preparation of bis-(4-biphenylyloxy)malonic acid diethyl ester.—Wash 43.3 parts (1.0 mole) of 56.7% sodium hydride in mineral oil with dry, low boiling petroleum ether. Then suspend the washed sodium hydride in 1500 parts by volume of dimethylacetamide and cool the obtained suspension to 0°. Add 187.2 parts (1.10 moles) of p-phenylphenol to the thus-cooled suspension at such a rate that the temperature thereof does not exceed 10° (external cooling with an ice/salt bath being employed as necessary).

After all of the p-phenylphenol is added, the formed suspension of the phenolate is stirred for an additional hour. Then remove the cooling bath, and add 159 parts (0.5 mole) of diethyldibromomalonate fairly rapidly to said formed suspension, allowing the temperature to rise about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Separate organic layer and dry over magnesium sulfate. Filter and evaporate solvent to dryness. Add 500 cc. isopropyl ether to crystallize product; wash with cold isopropyl ether. Dry the thus-washed crystals at 80° in vacuo for one hour to obtain bis-(4-biphenylyloxy)malonic acid diethyl ester, M.P. 107–108.5° C.

Step B: Preparation of bis-(4-biphenylyloxy)malonic acid.—Following the procedure of Step B of Example 1 and employing an equivalent amount of bis-(4-biphenylyloxy)malonic acid diethyl ester in place of the bis-(p-chlorophenoxy)malonic acid diethyl ester used therein, there is obtained the product bis-(4-biphenylyloxy)malonic acid.

EXAMPLE 3

Bis-(p-bromophenoxy)malonic acid

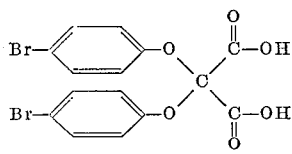

Step A: Preparation of bis-(p-bromophenoxy)malonic acid diethyl ester.—Following the procedure of Step A of Example 1 and employing an equivalent amount of p-bromophenol in place of the p-chlorophenol used therein, there is obtained the product bis-(p-bromophenoxy) malonic acid diethyl ester, M.P. 73–75° C.

Step B: Preparation of bis-(p-bromophenoxy)malonic acid.—Following the procedure of Step B of Example 1 and employing an equivalent amount of bis-(p-bromophenoxy)malonic acid diethyl ester in place of the bis-(p-chlorophenoxy)malonic acid diethyl ester used therein, there is obtained the product bis-(p-bromophenoxy)malonic acid.

EXAMPLE 4

Bis-(p-fluorophenoxy)malonic acid

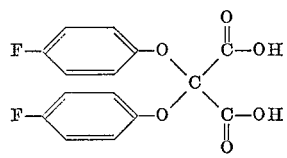

Step A: Preparation of bis-(p-fluorophenoxy)malonic acid diethyl ester.—Following the procedure of Step A of Example 1 and employing an equivalent of p-fluorophenol in place of the p-chlorophenol used therein, there is obtained the product bis-(p-fluorophenoxy)malonic acid diethyl ester, M.P. 50–51.5° C.

Step B: Preparation of bis-(p-fluorophenoxy)malonic acid.—Following the procedure of Step B of Example 1 and employing an equivalent amount of bis-(p-fluorophenoxy)malonic acid diethyl ester in place of the bis-(p-chlorophenoxy)malonic acid diethyl ester used therein, there is obtained the product bis-(p-fluorophenoxy)malonic acid.

EXAMPLE 5

Bis-(m-chlorophenoxy)malonic acid

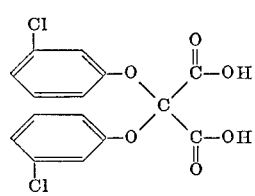

Step A: Preparation of bis-(m-chlorophenoxy)malonic acid diethyl ester.—Following the procedure of Step A of Example 1 and employing an equivalent amount of m-chlorophenol in place of the p-chlorophenol used therein, there is obtained the product bis-(m-chlorophenoxy)malonic acid diethyl ester, B.P. 120° C./0.015 mm.

Step B: Preparation of bis-(m-chlorophenoxy)malonic acid.—Following the procedure of Step B of Example 1 and employing an equivalent amount of bis-(m-chlorophenoxy)malonic acid diethyl ester in place of the bis-(p-chlorophenoxy)malonic acid diethyl ester used therein, there is obtained the product bis-(m-chlorophenoxy)-malonic acid.

EXAMPLE 6

Bis-(3,4-dichlorophenoxy)malonic acid

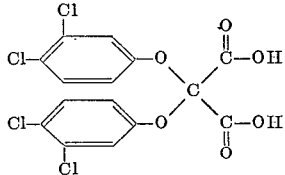

Step A: Preparation of bis-(3,4-dichlorophenoxy)malonic acid acid diethyl ester.—Following the procedure of Step A of Example 1 and employing an equivalent amount of 3,4-dichlorophenol in place of the p-chlorophenol used therein, there is obtained the product bis-(3,4-dichlorophenoxy)malonic acid diethyl ester, M.P. 95–96° C.

Step B: Preparation of bis-(3,4-dichlorophenoxy)malonic acid.—Following the procedure of Step B of Example 1 and employing an equivalent amount of bis-(3,4-dichlorophenoxy)malonic acid diethyl ester in place of the bis-(p-chlorophenoxy)malonic acid diethyl ester used therein, there is obtained the product bis-(3,4-dichlorophenoxy)malonic acid.

EXAMPLE 7

Bis-(o-chlorophenoxy)malonic acid

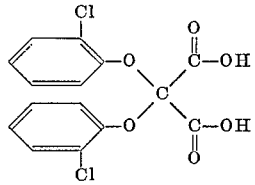

Step A: Preparation of bis-(o-chlorophenoxy)malonic acid diethyl ester.—Following the procedure of Step A of Example 1 and employing an equivalent amount of o-chlorophenol in place of the p-chlorophenol used therein, there is obtained the product bis-(o-chlorophenoxy) malonic acid diethyl ester, M.P. 111° C.

Step B: Preparation of bis-(o-chlorophenoxy)malonic acid.—Following the procedure of Step B of Example 1 and employing an equivalent amount of bis-(o-chlorophenoxy)malonic acid diethyl ester in place of the bis-(p-chlorophenoxy)malonic acid diethyl ester used therein, there is obtained the product bis(o-chlorophenoxy) malonic acid, M.P. 140–143° C. (dec.).

EXAMPLE 8

Bis-(2,4-dichlorophenoxy)malonic acid

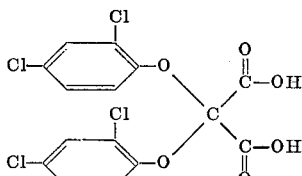

Step A: Preparation of bis-(2,4-dichlorophenoxy) malonic acid diethyl ester.—Following the procedure of Step A of Example 1 and employing an equivalent amount of 2,4-dichlorophenol in place of the p-chlorophenol used therein, there is obtained the product bis-(2,4-dichlorophenoxy)malonic acid diethyl ester, M.P. 73–74° C.

Step B: Preparation of bis-(2,4-dichlorophenoxy) malonic acid.—Following the procedure of Step B of Example 1 and employing an equivalent amount of bis-(2,4-dichlorophenoxy)malonic acid diethyl malonic acid diethyl ester used therein, there is obtained the product bis-(2,4-dichlorophenoxy)malonic acid, M.P. 154° C. (dec.).

EXAMPLE 9

Bis-(4-chloro-2-methylphenoxy malonic acid

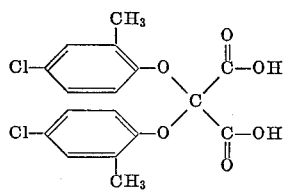

Step A: Preparation of bis-(4-chloro-2-methylphenoxy)malonic acid diethyl ester.—Following the procedure of Step A of Example 1 and employing an equivalent amount of 4-chloro-2-methylphenol in place of the p-chlorophenol used therein, there is obtained the product bis-(4-chloro-2-methylphenoxy)malonic acid diethyl ester, M.P. 75–77° C.

Step B: Preparation of bis - (4 - chloro - 2 - methylphenoxy)malonic acid.—Following the procedure of Step B of Example 1 and employing an equivalent amount of bis-(4-chloro-2-methylphenoxy)malonic acid diethyl ester in place of the bis-(p-chlorophenoxy)malonic acid diethyl ester, there is obtained the product bis-(4-chloro-2-methylphenoxy)malonic acid, M.P. 158–160° C.

EXAMPLE 10

Following the procedure of Step B of Example 1 and employing an equivalent amount of the malonic acid esters enumerated below in place of the bis-(p-chlorophenoxy) malonic acid diethyl ester used therein, there are obtained the malonic acids set forth below.

| Malonic acid ester | Malonic acid |
|---|---|
| (a) Bis-(p-trifluoromethylphenoxy) malonic acid diethyl ester. | Bis-(p-trifluoromethylphenoxy) malonic acid. |
| (b) Bis-(p-benzoylphenoxy) malonic acid diethyl ester. | Bis-(p-benzoylphenoxy)malonic acid. |
| (c) Bis-(p-acetamidophenoxy) malonic acid diethyl ester. | Bis-(p-acetamidophenoxy)malonic acid. |
| (d) Bis-(p-benzylphenoxy)malonic acid diethyl ester. | Bis-(p-benzylphenoxy)malonic acid. |
| (e) Bis-(4-chloro-2-nitrophenoxy) malonic acid diethyl ester. | Bis-(4-chloro-2-nitrophenoxy) malonic acid. |
| (f) Bis-(2,5-dichlorophenoxy) malonic acid diethyl ester. | Bis-(2,5-dichlorophenoxy)malonic acid. |
| (g) Bis-(2,3-dichlorophenoxy) malonic acid diethyl ester. | Bis-(2,3-dichlorophenoxy)malonic acid. |
| (h) Bis-(m-trifluoromethylphenoxy) malonic acid diethyl ester. | Bis-(m-trifluoromethylphenoxy) malonic acid. |
| (i) Bis-(3,5-dichlorophenoxy) malonic acid diethyl ester. | Bis-(3,5-dichlorophenoxy)malonic acid. |

The above enumerated esters are prepared following the procedure of Step A of Example 1 and employing an equivalent amount of the phenols set forth below in place of the p-chlorophenol used therein.

(a) p-trifluoromethylphenol
(b) p-benzoylphenol
(c) p-acetamidophenol
(d) p-benzylphenol
(e) 4-chloro-2-nitrophenol
(f) 2,5-dichlorophenol
(g) 2,3-dichlorophenol
(h) m-trifluoromethylphenol
(i) 3,5-dichlorophenol.

EXAMPLE 11

(4-biphenylyloxy)-(p-chlorophenoxy)malonic acid

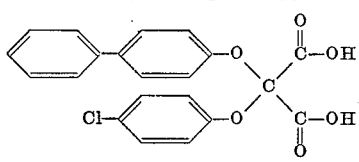

Step A: Preparation of (4-biphenylyloxy)-(p-chlorophenoxy)malonic acid diethyl ester.—(a) Sodium hydride (56.7% in mineral oil), 47 g. (1.0 mole) is washed free from mineral oil with low boiling petroleum ether and suspended in 750 ml. of dimethylacetamide. To the suspension is added 129 g. (1.0 mole) of p-chlorophenol in 500 ml. of dimethylacetamide in a manner so as to maintain the temperature of the mixture at about 10 to 20° C. The mixture is then stirred for two hours, 195 g. (1.0 mole) of diethylchloromalonate added, and the resulting mixture stirred at 80° C. for five hours and then at room temperature for 72 hours. The resulting mixture is then poured over 2 liters of ice water, extracted with 750 ml. of isopropyl ether and the separated organic layer extracted with cold 1 N sodium hydroxide. The organic layer is then dried over anhydrous sodium sulfate, filtered and evaporated to yield (p-chlorophenoxy)malonic acid diethyl ester.

Recrystallization from petroleum ether at 60° C. affords product, M.P. 44–46° C.

(b) To 1 liter of carbon tetrachloride is added 170 g. (0.59 mole) of (p-chlorophenoxy)malonic acid diethyl ester. While stirring at room temperature, 94.2 g. (0.59 mole) of bromine is added dropwise and the mixture stirred for 17 hours at room temperature and then at reflux for 2 hours. The mixture is then washed with 500 ml. of water and then 100 ml. of cold 10% aqueous soduim bicarbonate. The organic layer is then separated, dried over anhydrous sodium sulfate and evaporated to yield α-bromo-p-chlorophenoxy-malonic acid diethyl ester. Fractionation affords product, B.P. 131° C./.05 mm.

(c) To 200 ml. of dimethylacetamide is added 17 g. (0.1 mole) of p-phenylphenol and the resulting mixture added dropwise, with stirring, to a suspension of 4.6 g. (0.1 mole) of 56.7% sodium hydride (previously washed free of mineral oil with petroleum ether) in 100 ml. of dimethylacetamide. The resulting mixture is stirred at room temperature for 90 minutes and 36.5 g. (0.1 mole) of α-bromo-p-chlorophenoxy-malonic acid diethyl ester in 50 ml. of dimethylacetamide is added in several portions. The mixture is then stirred with 1 g. of potassium iodide at room temperature for 72 hours, then at 50° C. for 30 minutes and then poured over 1500 ml. of ice water, and extracted with 500 ml. of isopropyl ether. The ether layer is then extracted with 100 ml. of cold 1 N sodium hydroxide, dried over anhydrous sodium sulphate, filtered and evaporated to yield (4-biphenylyloxy)-(p-chlorophenoxy)malonic acid diethyl ester, M.P. 79–81° C.

Step B: Preparation of (4-biphenylyloxy)-(p-chlorophenoxy malonic acid.—Folowing the procedure of Step B of Example 1 and employing an equivalent amount of (4-biphenylyloxy)-(p-chlorophenoxy)malonic acid diethyl ester in place of the bis-(p-chlorophenoxy)malonic acid diethyl ester used therein, there is obtained the product (4-biphenylyloxy)-(p-chlorophenoxy)malonic acid.

EXAMPLE 12

(p-Chlorophenoxy)-(p-bromophenoxy)malonic acid

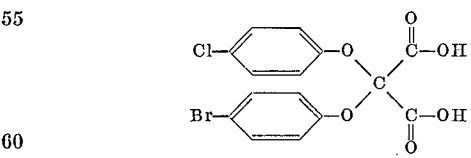

Step A: Preparation of (p-chlorophenoxy)-(p-bromophenoxy)malonic acid diethyl ester.—Following the procedure of Step A of Example 11 and employing an equivalent amount of p-bromophenol in place of the p-phenylphenol used therein, there is obtained the product (p-chlorophenoxy) - (p-bromophenoxy)malonic acid diethyl ester, M.P. 55–56° C.

Step B: Preparating of (p-chlorophenoxy)-(p-bromophenoxy)malonic acid.—Following the procedure of Step B of Example 1 and employing an equivalent amount of (p-chlorophenoxy) - (p - bromophenoxy)malonic acid diethyl ester in place of the bis-(p-chlorophenoxy)malonic acid diethyl ester used therein, there is obtained the product (p-chlorophenoxy) - (p-bromophenoxy)malonic acid.

EXAMPLE 13

(p-Chlorophenoxy)-(p-fluorophenoxy)malonic acid

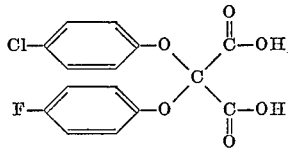

Step A: Preparation of (p-chlorophenoxy)-(p-fluorophenoxy)malonic acid diethyl ester.—Following the procedure of Step A of Example 11 and employing an equivalent amount of p-fluorophenol in place of the p-phenylphenol used therein, there is obtained the product (p-chlorophenoxy) - (p-fluorophenoxy)malonic acid diethyl ester, B.P. 160° C./0.25 mm. Crystallization from petroleum ether affords crystalline product, M.P. 40–41° C.

Step B: Preparation of (p-chlorophenoxy)-(p-fluorophenoxy)malonic acid.—Following the procedure of Step B of Example 1 and employing an equivalent of (p-chlorophenoxy) - (p-fluorophenoxy)malonic acid diethyl ester in place of the bis-(p-chlorophenoxy)malonic acid diethyl ester, there is obtained the product (p-chlorophenoxy)-(p-fluorophenoxy)malonic acid.

EXAMPLE 14

Following the procedure of Step B of Example 1 and employing an equivalent amount of the malonic acid esters enumerated below in place of the bis-(p-chlorophenoxy)malonic acid diethyl ester used therein, there are obtained the malonic acids set forth below:

| Malonic acid ester | Malonic acid |
| --- | --- |
| (a) Bis-[p-(phenylthio)phenoxy]-malonic acid diethyl ester. | Bis-[p-(phenylthio)phenoxy]-malonic acid. |
| (b) Bis-(p-anilinophenoxy)malonic acid diethyl ester. | Bis-(p-anilinophenoxy)malonic acid. |
| (c) Bis-[p-(methylthio)phenoxy]-malonic acid diethyl ester. | Bis-[p-(methylthio)phenoxy]-malonic acid. |

The above enumerated esters are prepared following the procedure of Step A of Example 1 and employing an equivalent amount of the phenols set forth below in place of the p-chlorophenol used therein.

(a) p-(phenylthio)phenol
(b) p-(anilino)phenol
(c) p-(methylthio)phenol.

What is claimed is:
1. A compound of the formula

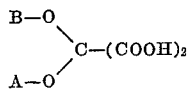

wherein: A is either m-trifluoromethylphenyl,

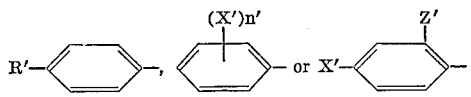

X' represents halogen;
Z' represents alkyl having from 1 to 4 carbon atoms or nitro; and
n' represents a whole number of from 1 to 2, inclusive;
R' is trifluoromethyl, acetamido, methylthio, phenyl, phenylthio, anilino, benzoyl, or benzyl; [alkanoylamido, having from 2 to 4 carbon atoms, alkylthio, having from 1 to 4 carbon atoms, or an aromatic moiety of the formula

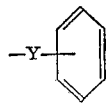

wherein:
Y is either a direct bond or a bridging member of the group oxygen, sulfur, imino, carbonyl or straight chain alkylene, having from 1 to 4 carbon atoms;]
B is either the same as A; or B is

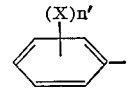

When A is either

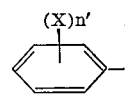

or

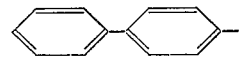

wherein X' and n' are as defined above, and X represents halogen which is unlike X'.

2. A compound of claim 1 wherein A is the same as B.
3. A compound of claim 1 wherein B is

when A is

4. A compound of claim 1 wherein B is

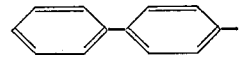

when A is

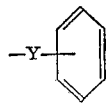

5. A compound of claim 1 wherein A and B are as defined in claim 1 with the provision that any of X' and X represents halogen having an atomic weight of no greater than 80.

6. A compound of claim 2, wherein A and B are as defined in claim 1, with the provision that X' represents halogen having an atomic weight no greater than 80.

7. A compound of claim 3 wherein n' is as defined in claim 1, with the provision that any of X' and X represents halogen having an atomic weight no greater than 80.

8. A compound of claim 4 wherein n' is as defined in claim 1, with the provision that X represents halogen having an atomic weight no greater than 80.

9. A compound of claim 2 which is bis-(p-benzylphenoxy)malonic acid, bis-(p-acetamidophenoxy)malonic acid, or bis-(p-benzoylphenoxy)malonic acid.

10. A compound of claim 2 which is bis-(p-fluorophenoxy)malonic acid, bis-(o - chlorophenoxy)malonic acid, bis-(2,5-dichlorophenoxy)malonic acid, bis-(2,3- dichlorophenoxy)malonic acid and bis-(3,5-dichlorophenoxy)malonic acid.

11. A compound of claim 2 which is bis-(4-chloro-2-nitrophenoxy)malonic acid, or bis-(4-chloro-2-methylphenoxy)malonic acid.

12. Bis-(4-biphenylyloxy)malonic acid.
13. Bis-(p-chlorophenoxy)malonic acid.
14. Bis-(p-bromophenoxy)malonic acid.
15. (4-biphenylyloxy)-(p-chlorophenoxy)malonic acid.

16. (p - Chlorophenoxy)-(p - bromophenoxy)malonic acid.
17. (p - Chlorophenoxy)-(p - fluorophenoxy)malonic acid.
18. Bis-(3,4-dichlorophenoxy)malonic acid.
19. Bis-(m-chlorophenoxy)malonic acid.
20. Bis-(p-trifluoromethylphenoxy)malonic acid.
21. Bis-(m-trifluoromethylphenoxy)malonic acid.
22. Bis-(2,4-dichlorophenoxy)malonic acid.

References Cited

Niederl et al.: JACS, 62, 1154 (1940).
Conrad et al.: Berichte, 24, 3004 (1891).

LORRAINE A. WEINBERGER, Primary Examiner
DENNIS E. STENZEL, Assistant Examiner

U.S. Cl. X.R.

260—516, 519